(12) United States Patent
Hager

(10) Patent No.: US 7,068,152 B2
(45) Date of Patent: Jun. 27, 2006

(54) REMOTE DE-ACTIVATION SYSTEM FOR A VEHICLE

(76) Inventor: Michael Hager, P.O. Box 3597, Pikeville, WV (US) 41502

( * ) Notice: Subject to any disclaimer, the term of this patent is extended or adjusted under 35 U.S.C. 154(b) by 113 days.

(21) Appl. No.: 10/818,035

(22) Filed: Apr. 5, 2004

(65) Prior Publication Data

US 2005/0237167 A1 Oct. 27, 2005

(51) Int. Cl.
B60R 25/10 (2006.01)
(52) U.S. Cl. .............. 340/426.15; 340/425.5; 307/10.2
(58) Field of Classification Search ........... 340/426.15, 340/426.1, 425.5, 438, 426.17, 825.69, 815.4; 307/10.2, 10.3
See application file for complete search history.

(56) References Cited

U.S. PATENT DOCUMENTS

| | | | |
|---|---|---|---|
| 5,285,186 A | 2/1994 | Chen | 340/428 |
| 5,307,048 A | 4/1994 | Sonders | 340/426 |
| 5,477,090 A * | 12/1995 | Davis | 307/10.1 |
| 5,506,562 A * | 4/1996 | Wiesner | 340/425.5 |
| 5,513,244 A * | 4/1996 | Joao et al. | 455/404.1 |
| 5,533,589 A * | 7/1996 | Critzer | 180/287 |
| 5,539,377 A | 7/1996 | Dillon | 340/426 |
| 5,608,272 A | 3/1997 | Tanguay | 307/10.2 |
| 5,635,899 A | 6/1997 | Carlo et al. | 340/426 |
| 5,652,564 A * | 7/1997 | Winbush | 340/426.12 |
| 5,673,575 A | 10/1997 | Carlo et al. | 70/209 |
| 5,677,664 A | 10/1997 | Sawinski | 340/426 |
| 5,801,455 A | 9/1998 | Borch et al. | 307/10.3 |
| 5,811,887 A | 9/1998 | Peyre et al. | 307/10.3 |
| 5,861,799 A | 1/1999 | Szwed | 340/425.5 |
| 6,147,418 A | 11/2000 | Wilson | 307/10.6 |
| 6,349,786 B1 | 2/2002 | Gift | 180/271 |

* cited by examiner

Primary Examiner—Phung T. Nguyen
(74) Attorney, Agent, or Firm—Waters Law Office; Robert R. Waters; Brian W. Foxworthy

(57) ABSTRACT

The present invention is a remote de-activation system for use with vehicles or other motorized equipment consisting of a remote portable RF signal generation unit which communicates with an RF receiver mounted on the vehicle to be disabled. The receiver unit features circuit interruption switching or relays and is transposed within the ignition circuit of the vehicle or equipment to be disabled. The system is further characterized as including independent power sources for the RF transmitter, receiver and alarm systems such as to prevent malfunction of the system through compromising the power sources. Alternative embodiments include the utilization of a centralized battery charger and key locks.

9 Claims, 2 Drawing Sheets

REMOTE DE-ACTIVATION SYSTEM FOR A VEHICLE

BACKGROUND OF THE INVENTION

1. Field of the Invention

This invention relates generally to a system for remote de-activation of electro-mechanical equipment such as a vehicle, in order to circumvent injury or danger to the equipment operator or others. Specifically, the invention relates to a remote deactivation apparatus for particular utility in monitoring the operation of all-terrain vehicles, mowing equipment or recreational vehicles whereby an observer can monitor operation for safety purposes and act quickly to disable the vehicle should a dangerous event occur or appear likely.

2. Description of the Related Art

During the last twenty years, Americans have witnessed a dramatic rise in motorized equipment for home and recreational use. For example, the use of riding lawn mowers has increased significantly as more families prefer the ease and comfort of a riding mower compared to conventional push mowers. In addition, the power and speed capabilities of such implements have greatly increased, while at the same time, consumers demand more fail-safe protective features on such vehicles. The trade-off between speed and power versus a reduced tolerance for injury is a challenge for equipment designers and a key consideration in design strategy.

Another type of recreational vehicle which has enjoyed widespread popularity in recent years is the all-terrain vehicle (ATV). The ATV is meant to be used in off-road recreational exercises. Mud, hills, bumps and surprise terrain are all part of the fun. Of course, unstable terrain is also a key source of danger, and since the operator is generally on top of the vehicle and unprotected except for perhaps a helmet, a roll-over can be a very dangerous event. In such a situation, it is very important that the engine of the vehicle be disabled as quickly as possible in order to prevent continued or increased injury to the operator or others. This invention is directed to addressing that need.

Along with the rise in recreational vehicle and other small vehicle/implement usage, is the prevalence of operation by younger operators including teenagers and pre-teens. In most states, it remains legal for children to operate riding lawn mowers or all-terrain vehicles, as long as they are not operated on streets or highways. In addition, where legal restrictions do exist, enforcement is particularly lax because ATVs, by their very nature, are operated in rural areas away from enforcement authorities. The rural nature of ATV operation is further grounds for safety concern since medical assistance may not be readily available.

When a young operator is learning to drive an ATV, riding lawn mower, or other motorized vehicle, a parent or other adult often stands nearby to give instruction and aid in an emergency situation. However, when such a young operator begins losing control of the machine, there is often very little a parent can do from the sidelines except run to the scene of the accident. It is usually not possible for a spectator to commandeer control of the vehicle in enough time to prevent the accident. For this reason, it would be very helpful to be able to remotely de-activate a motorized vehicle under such circumstanced in order to pre-empt an accident that is eminent. This invention is directed to providing such a system.

The prior art consists of a wide assortment of devices that are directed to interrupting an engine or disabling movement of a vehicle by some means or mechanism. Many of the prior art systems are more specifically directed to theft deterrence or vehicle security systems. Those patents include U.S. Pat. No. 5,539,377 to Dillon, wherein the inventor describes an anti-theft system which includes a main control module mounted under a vehicle dashboard. A wiring harness runs from the main control module to an ignition kill relay module which is wired in series with the ignition command circuit between the engine microprocessor and the vehicle's electronic ignition module. The ignition kill relay module is energized by an unauthorized event signal from the main control module, and serves to interrupt the computer ignition command signal. The module is preferably hidden within a vehicle to prevent it from being easily found and disabled.

U.S. Pat. No. 5,608,272 to Tanguay claims an anti-theft device which features the ability to program the device to disable the vehicle upon the occurrence of certain predetermined incidents or factors. In essence, the Tanguay device provides a measure of security against kidnaping or car jacking because even when the operator is present in the vehicle, the vehicle may be disabled when taken by an unauthorized person. The activation of the system occurs by enablement of an EPROM chip wherein an encrypted code is stored. The invention specifies a code that is both unique and inviolable. Upon an unauthorized occurrence, the vehicle is disabled by shutting off the ignition or fuel supply.

U.S. Pat. No. 6,147,418 to Wilson discloses a remote device for starting a vehicle such as an automobile. The primary utility for the Wilson device is to create a means for starting a vehicle such that the interior may be preheated or precooled for the driver's comfort. In the preferred embodiment, the invention consists of a starting apparatus with a built-in timer. The invention includes a transmitting unit located with the driver, and a receiver unit located in the vehicle. The transmitter includes a manual switch, and the receiver is installed in the vehicle such that it is wired into the ignition circuit. The vehicle may be started by either the conventional key method or a remote starter method.

U.S. Pat. No. 6,349,786 by Gift discloses an emergency stopping mechanism for disabling the engine in a recreation vehicle operated by a child. The Gift system includes a mechanical toggle-type switch used as a kill switch which grounds out the spark plug of the vehicle. Although the primary embodiment discussed is a flag-type mechanical throw switch, remote control actuation is also disclosed. The Gift invention is rather simple in scope and is limited by all of the usual problems associated with a mechanical switch.

The prior art includes other arrangements for engine disablement using remote activation means. These include U.S. Pat. No. 5,307,048 to Sonders; U.S. Pat. No. 5,285,186 to Chen; and U.S. Pat. No. 5,677,664 to Sawinski. All of the prior art devices suffer from the disadvantage that they are complicated, expensive and/or not easily transferred between vehicles or equipment to which they are to be applied.

SUMMARY OF THE INVENTION

It is a primary objective of the present invention to provide a remote de-activation mechanism which overcomes the limitations of the prior art as described above. Specifically, this invention is much more flexible and economical to use and can be utilized both in moving vehicles and stationary equipment.

It is another object of the present invention to provide a remote de-activation mechanism which is easy to install and operate as add-on, aftermarket equipment. Unlike many prior art devices, the system disclosed in the present invention may be installed and removed for reuse in other applications. It is a further object of this invention to create a remote de-activation system which is economical to use such that widespread application of the invention is economically feasible as well as technically feasible.

It is a further objective of this invention to provide a remote de-activation system that features dual-alarm capabilities for recognizing the activation of the disabling mechanism such that the operator of the vehicle will know the source of the problem with the engine of the vehicle or machinery. Accordingly, it will be immediately recognized that a de-activation trip signal has been received as opposed to mechanical difficulties in the engine or some other cause.

It is yet another objective of this invention to provide a remote de-activation system that is triggered by an RF signal. The preferred embodiment of the invention is further characterized by multiple isolated power supply systems in order to bolster the reliability of the system.

It is a further objective of this invention to provide a remote de-activation mechanism which can be utilized on all-terrain vehicles, riding lawn mowers or other small engine vehicular devices to enable a parent or other adult to train a child or new operator in the safe operation of such a vehicle. Accordingly, the trainer or bystander may have control of the de-activation device such as to be able to quickly de-activate the engine of the vehicle should an emergency situation arise.

As discussed above, the device of the present invention overcomes the disadvantages inherent in prior art methods and devices. In this respect, before explaining at least one embodiment of the invention in detail, it is to be understood that the invention is not limited in its application to the details of construction and to the arrangement of the components set forth in following description or illustrated in the drawings. The invention is capable of other embodiments and of being practiced and carried out in various ways. Also, it is to be understood that the phraseology and terminology employed herein are for the purposes of description and should not be regarded as limiting.

Accordingly, those skilled in the art will appreciate that the concepts upon which this invention is based may readily be utilized as a basis for the design of other structures, methods, and systems for carrying out the several purposes of the present invention. It is important, therefore, that the language of the application be regarded as including such equivalent constructions insofar as they do not depart from the spirit and scope of the present invention.

Furthermore, the purpose, of the foregoing abstract is to enable the U.S. Patent and Trademark Office and the public generally, and especially including the practitioners in the art who are not familiar with patent or legal terms or phraseology, to determine quickly from a cursory inspection, the nature and essence of the technical disclosure of the application. The abstract is neither intended to define the invention of the application, nor is it intended to be limiting to the scope of the invention in any way.

DETAILED DESCRIPTION OF THE PREFERRED EMBODIMENT

Figure 1:
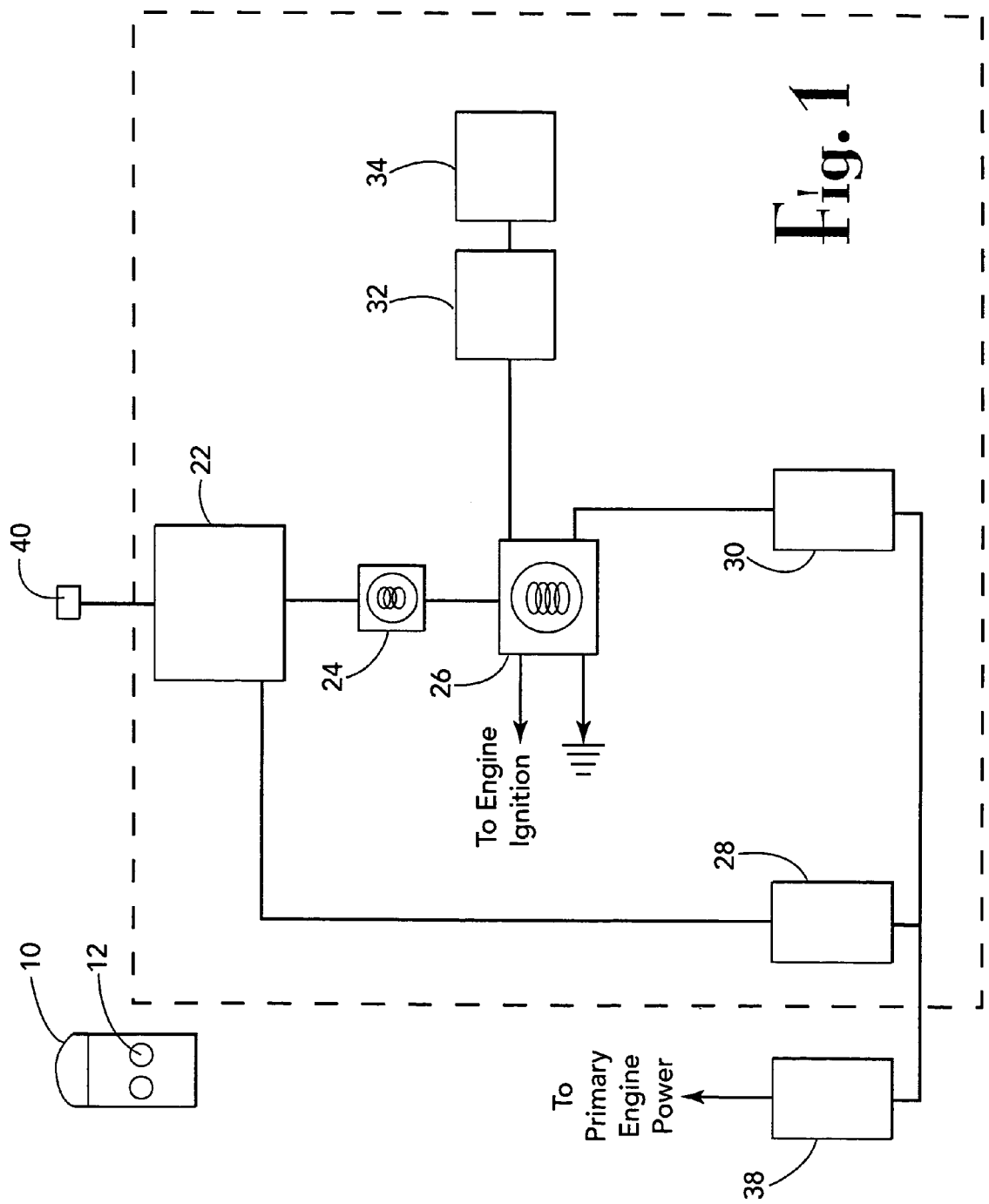
FIG. 1 is a wiring diagram of the invention showing the primary components including the disabling system, power source arrangement and alarm systems.
Figure 2:
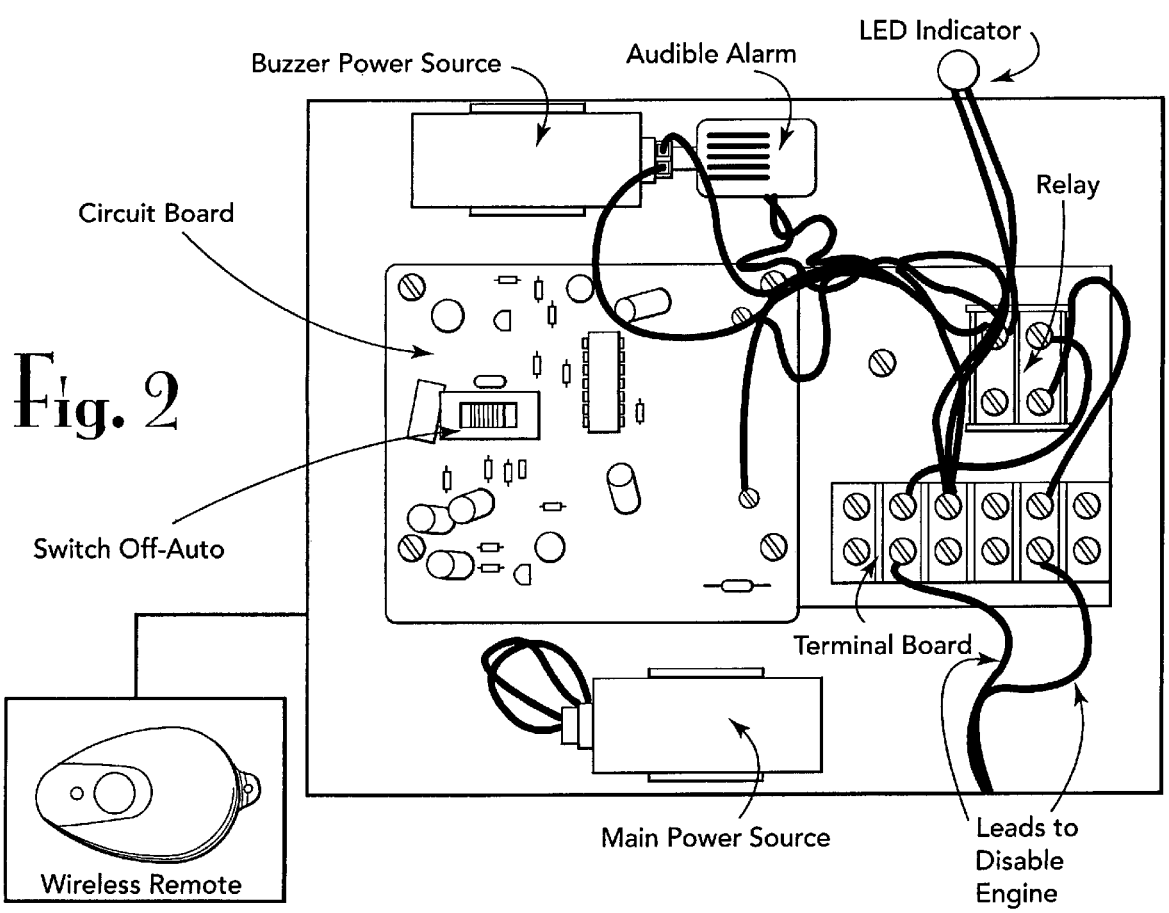
FIG. 2 is an enlarged plan view of an actual layout of the primary components in the preferred embodiment of the invention.

The remote engine de-activation system of the present invention may be practiced in a variety of ways, and may feature a number of constructions. FIG. 1 shows a wiring diagram of the preferred embodiment, although many other layouts and embodiments are possible. Specifically, FIG. 1 shows the electrical arrangement of the de-activation system's primary components, while FIG. 2 shows a typical physical layout.

The remote activation unit 10 generally takes the form of a portable hand held switching mechanism which may be attached, for example, to a keychain or like device. The remote activation unit 10 includes an RF transmitter embedded therein and switch 12 is optimally a spring loaded push-button type switch for temporary on/off activation. In use, when the user depresses switch 12, the RF transmitter is engaged and a signal is wirelessly transmitted. With a second depression of switch 12, the transmitter is turned off. The portable remote activation unit includes its own power source (not shown) which may be, for example, a small watch battery or the like. The remote activation unit 10 features the capability for the power source (battery) to be changed or maintained on a regular basis.

As further shown in FIG. 1, the circuit components of the engine disabling mechanism are located in a weatherproof housing 20, shown by the dashed line. The weatherproof housing 20 may be constructed of standard materials such as steel, aluminum, or durable plastic, and optimally features a hinged portion (not shown) such that access can be obtained to the components of the disabling mechanism. The weatherproof housing also features a keylock (not shown) to prevent tampering and to prevent unauthorized access into the interior of the housing. In the preferred embodiment, the key lock for the weatherproof housing utilizes a separate and distinct key from the ignition key of the vehicle upon which the weatherproof housing is mounted. In a further alternative embodiment, the weatherproof housing may feature an additional key mechanism which serves to disable the remote de-activation system, removing the system electrically from the engine circuit altogether.

The weatherproof housing 20 may also serve other objectives depending on the particular application. For example, one important embodiment involves the use of this invention on a jet ski vehicle. Obviously, a waterproof box is essential in such an atmosphere. Another very important use of the present invention is to provide a remote de-activation mechanism for mining or manufacturing equipment. In the event of an emergency, even a few seconds delay in accessing the kill switch could be crucial. Yet, in order to get the de-activation signal as close as possible to the potential problem area, the unit may need to be located in an environmentally challenging area such as an area prevalent to chemicals, vibration or moisture. The weatherproof housing enables the device to be much more flexible in use.

An RF receiving unit 22 is located within weatherproof housing 20 and tuned and arranged such as to receive a signal transmitted from RF transmitter 10. The system may optionally feature an external antenna 40 which serves the purpose of improving receptivity for the RF receiver. External antenna 40 may be mounted at any convenient location on the vehicle or machinery such as to facilitate signal receptivity while not compromising safe operation of the vehicle. Upon closing of switch 12, a wireless communication is initiated by RF transmitter 10 and received by RF receiver 22.

The remote de-activation system is further characterized to include primary relay 24 which is a "normally open" relay where shown in FIG. 1. The system is further characterized by a secondary "normally open" relay 26 which serves as the interruption mechanism for the engine ignition circuit as shown. In order to assure safe operation, relay 26 must have a current rating of at least 15 Amps. Depending on wiring preferences and alternatives, relays 24 and 26 could also be arranged as normally closed relays and other customary relay alternatives such as solid state switches may also be utilized.

In operation, when a RF signal is received by receiver 22, a signal is sent to primary relay 24 which in turn activates secondary engine interruption relay 26.

The system is further characterized in that the RF receiver is powered by power supply 28 which also provides power to other essential components of the interruption circuit. As further shown in FIG. 1, an independent power supply, 30, is included in the system, and power supply 30 serves as the power source for the alarm systems. Each of power supply 28 and power supply 30 are housed in weatherproof housing 20. By arranging the system to include independent power sources, reliability of the system is enhanced as it will not be necessary to compromise the integrity of the activation or alarm system by using the power system of the vehicle.

The system may be arranged with one or more optional alarm systems, shown in FIG. 1 as 32 and 34, located within the weatherproof housing indicated by the dotted line. These alarms assist in indicating the stats of the de-activating system. Among the alarm options, an LED or other light indicator may be used to show the operator when the engine has been shut down due to operation of the remote de-activation system. If the engine is shut down by normal methodology, i.e., by turning off the key, the LED will not be lit. An LED indicator is also shown in FIG. 2. Other alarm alternatives are also available including audible alarms or combinations of audible and visual alarm mechanisms.

FIG. 1 also shows an optional battery charger 38 which may be incorporated to provide a charging current to maintain power supplies 28 and 30.

FIG. 2 is an enlarged plan view of the receiver unit of the remote de-activation system, showing the top cover removed. As shown, two distinct battery sources are orientated to provide the primary power source and the alarm power source. Mounting blocks and an audible alarm can also be seen in the Figure. In the lower left inset, a preferred embodiment of the wireless remote switch can be seen. Although the representations in FIG. 2 are typical, numerous other physical constructions are also possible.

I claim:

1. An equipment disablement system for a motorized vehicle or machinery comprising:
   a. a remote, portable transmitting unit comprising:
      i) a means for transmitting a radio frequency signal for wireless communication,
      ii) a power source internal to said remote, portable transmitting unit, and
      iii) a switch to enable operation of said transmission means upon activation of said switch;
   b. a weatherproof housing located upon the motor vehicle or machinery within easy access to the power circuit of said vehicle or machinery or the controls for the power circuit of said vehicle or machinery, and which is also accessible to the operator;
   c. an RF signal receiver mounted within said weatherproof housing on the vehicle or machinery, said receiver oriented to receive a signal from said remote portable transmitting unit, and said receiver connected to a second power source housed within said weatherproof housing;
   d. a switching mechanism located within said weatherproof housing and oriented as to open or close the power circuit or controls to the power circuit of said vehicle or machinery upon receipt of a signal from said RF signal receiver;
   e. a status indication means for indicating the status of said RF signal receiver to provide information to the operator indicating that a remote disablement signal has been received, said status indication means being located within said weatherproof housing, and being connected to a third power source located within said weatherproof housing;
   f. an antenna connected to said receiver and located upon said vehicle or machinery for improving reception of a signal from said remote portable transmitting unit.

2. An equipment disablement system as set forth in claim One wherein said first, second and third power source are batteries.

3. An equipment disablement system as set forth in claim Two wherein the system includes a battery charger powered by the power system of the vehicle or machinery, said battery charger supplying charging current to said second and third power sources, and said second and third power sources are rechargeable batteries.

4. An equipment disablement system as set forth in claim One wherein said first switching mechanism is a spring-loaded push button switch.

5. An equipment disablement system as set forth in claim One wherein said second switching mechanism is a normally open/normally closed relay switch.

6. An equipment disablement system as set forth in claim One wherein said status indication means is an audible alarm, a light indicator, or both.

7. An equipment disablement system as set forth in claim One wherein the apparatus includes a key operated on/off activation switch for bypassing the remote vehicle disablement apparatus, wherein said key lock mechanism is located on the outside case of said weatherproof housing, and wherein said key lock system is operated by a key that is separate and distinct from the ignition key of the vehicle.

8. An equipment disablement system as set forth in claim One wherein the apparatus is used to provide remote de-activation for a riding lawn mower, an all-terrain vehicle, a go cart, snowmobile or a personal watercraft vehicle.

9. An equipment disablement system as set forth in claim One wherein the apparatus is used to provide remote de-activation for a manufacturing process or for mining machinery.

* * * * *